(12) United States Patent
Ohmi

(10) Patent No.: US 9,528,678 B2
(45) Date of Patent: Dec. 27, 2016

(54) VEHICULAR LAMP

(71) Applicant: KOITO MANUFACTURING CO., LTD., Tokyo (JP)

(72) Inventor: Takeshi Ohmi, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 14/308,193

(22) Filed: Jun. 18, 2014

(65) Prior Publication Data

US 2014/0376252 A1 Dec. 25, 2014

(30) Foreign Application Priority Data

Jun. 19, 2013 (JP) ................ 2013-128439

(51) Int. Cl.
| | | |
|---|---|---|
| *B60Q 1/26* | (2006.01) | |
| *F21S 8/10* | (2006.01) | |
| *B60Q 1/00* | (2006.01) | |

(52) U.S. Cl.
CPC .......... *F21S 48/214* (2013.01); *B60Q 1/0041* (2013.01); *B60Q 1/2607* (2013.01); *F21S 48/211* (2013.01); *F21S 48/217* (2013.01); *H01L 2251/5361* (2013.01)

(58) Field of Classification Search
CPC .... F21S 48/217; B60Q 1/0041; B60Q 1/0047; B60Q 1/0052; B60Q 1/0058
USPC ........................................................ 362/545
See application file for complete search history.

(56) References Cited

U.S. PATENT DOCUMENTS

| | | | | |
|---|---|---|---|---|
| 7,362,046 | B2* | 4/2008 | Aston ........................ | 313/498 |
| 2003/0169160 | A1* | 9/2003 | Rodriguez Barros et al. ........................ | 340/426.1 |
| 2005/0129841 | A1* | 6/2005 | McCormick et al. ......... | 427/66 |
| 2008/0239744 | A1* | 10/2008 | Nakada et al. ............... | 362/516 |
| 2013/0026504 | A1* | 1/2013 | Marx et al. ..................... | 257/88 |
| 2013/0049570 | A1* | 2/2013 | Natsume ...................... | 313/498 |
| 2013/0063966 | A1* | 3/2013 | Sumi et al. ................... | 362/602 |
| 2013/0249396 | A1* | 9/2013 | Hafner et al. ................. | 315/82 |
| 2013/0258698 | A1* | 10/2013 | Saito ............................ | 362/520 |
| 2014/0056020 | A1* | 2/2014 | Bungenstock et al. ....... | 362/549 |

FOREIGN PATENT DOCUMENTS

JP 2011-150887 A 8/2011

OTHER PUBLICATIONS

Patent Abstracts of Japan for Japanese Publication No. 2011-150887, publication date Aug. 4, 2011 (1 page).

* cited by examiner

*Primary Examiner* — Nimeshkumar Patel
*Assistant Examiner* — Christopher Raabe
(74) *Attorney, Agent, or Firm* — Osha Liang LLP

(57) ABSTRACT

A vehicular lamp includes a plurality of light emitting units, each of light emitting units including a substrate, an organic electro luminescence device having an organic light emitting layer formed on the substrate, and a cap configured to seal the organic electro luminescence device. At least two of the plurality of light emitting units have the organic light emitting layers which are different in shape or size, the substrates which are same in shape and size, and the caps which are same in shape and size.

5 Claims, 5 Drawing Sheets

VEHICULAR LAMP

CROSS-REFERENCE TO RELATED APPLICATION(S)

The present application claims the benefit of priority of Japanese Patent Application No. 2013-128439 filed on Jun. 19, 2013. The disclosures of the application are incorporated herein by reference.

BACKGROUND

Technical Field

The present disclosure relates to a vehicular lamp which includes a plurality of light emitting units having an organic electro luminescence (EL) device.

Related Art

Some of vehicular lamps such as rear combination lamps, for example, include a light emitting unit which utilizes an organic EL (Electro Luminance) device (hereinafter, referred to as an "organic EL light emitting unit") as a light emitting device. Organic EL light emitting units which are used in vehicular lamps have a general construction in which an organic EL device having an organic light emitting layer is formed on a glass substrate, for example, and the organic EL device is sealed by a glass or metallic cap.

JP-A-2011-150887 discloses a vehicular lamp which includes a plurality of organic EL light emitting units having organic light emitting layers (light emitting areas) which are different in shape or size from one another. It is possible to realize an improvement in degree of freedom in designing a light distribution pattern or in design of an external appearance of the vehicular lamp by having the plurality of organic EL light emitting units having the organic light emitting layers which are different in shape or size from one another.

However, in the present situations, the shapes or sizes of substrates and caps of an organic EL light emitting unit are set to match the shapes or sizes of corresponding organic light emitting layers. Thus, in the case of the vehicular lamp in which the organic light emitting layers have the different shapes or sizes, the shapes or sizes of the substrates and caps of the individual organic EL light emitting units are set newly one by one to match the shapes or sizes of the corresponding organic light emitting layers. This leads to an increase in the number of man-hours, promoting an increase in production costs of the vehicular lamp.

Here, in relation to vehicular lamps which include a plurality of organic EL light emitting units, it is considered to change the shapes or sizes of organic light emitting layers not only in one vehicular lamp but also between different vehicular lamps to differentiate a characteristic such as design of one vehicular lamp from that of another according to vehicle lines or grades, for example. In this way, in the event that the shapes or sizes of the organic light emitting layers are made to differ from one another between the vehicular lamps, quite a large number of types of organic EL light emitting units have to be produced. Consequently, forming substrates and caps newly one by one to match the shapes or sizes of corresponding organic light emitting layers in the way described above leads to a large increase in production costs of vehicular lamps which are to be produced in a small amount but in various types.

SUMMARY

Exemplary embodiments of the invention provide a vehicular lamp including a plurality of light emitting units having light emitting layers which are different in shape or size from one another, in which an increase in production costs of the vehicular lamp can be prevented.

A vehicular lamp according to an exemplary embodiment, includes:

a plurality of light emitting units, each of light emitting units including a substrate, an organic electro luminescence device having an organic light emitting layer formed on the substrate, and a cap configured to seal the organic electro luminescence device, wherein at least two of the plurality of light emitting units have the organic light emitting layers which are different in shape or size, the substrates which are same in shape and size, and the caps which are same in shape and size.

By adopting this configuration, it is possible to use the same substrates and caps commonly among the organic light emitting layers which are different in shape or size.

All the light emitting units may have the substrates which are same in shape and size and the caps which are same in shape and size.

By adopting this configuration, it is possible to use the same substrates and caps commonly among all the light emitting units of the vehicular lamp.

A light distribution pattern may be formed by overlapping light from the plurality of light emitting units having the organic light emitting layers which are different in shape or size.

By adopting this configuration, it is possible to form a light distribution pattern by overlapping a plurality of light distributions having different luminous intensity distributions.

In at least three of the plurality of light emitting units, an area of the organic light emitting layer formed on the light emitting unit which is positioned in the center of the three light emitting units may be the largest, and areas of the organic light emitting layers of the light emitting units may become smaller as the light emitting units are positioned farther away from the centrally positioned light emitting unit.

By adopting this configuration, in the luminous intensity distribution of the light distribution pattern which is formed by the light from the at least three light emitting units, the luminous intensity becomes the strongest at the center and gradually reduces as the light distribution pattern expands from the center thereof.

At least two of the plurality of light emitting units may be partially overlapped each other in a depth-wise direction, and of the two light emitting units, the organic light emitting layer of the light emitting unit which is positioned on a farther side may be formed only in an area which does not overlap the organic light emitting layer of the light emitting unit which is positioned on a near side.

By adopting this configuration, in the light emitting unit which is disposed on the farther side, no light emitting layer is formed on the wasteful area which is covered by the organic light emitting layer of the light emitting unit which is disposed on the near side.

According to the exemplary embodiments of the invention, it is possible to prevent increase in production costs of a vehicular lamp which includes a plurality of light emitting units having light emitting layers which are different in shape or size from one another.

DETAILED DESCRIPTION

Hereinafter, exemplary embodiments of a vehicular lamp according to the invention will be described by reference to the accompanying drawings.

A vehicular lamp 1 is configured as a rear combination lamp, for example, and is mounted at each of left and right end portions of a rear end portion of a vehicle body.

Figure 1:
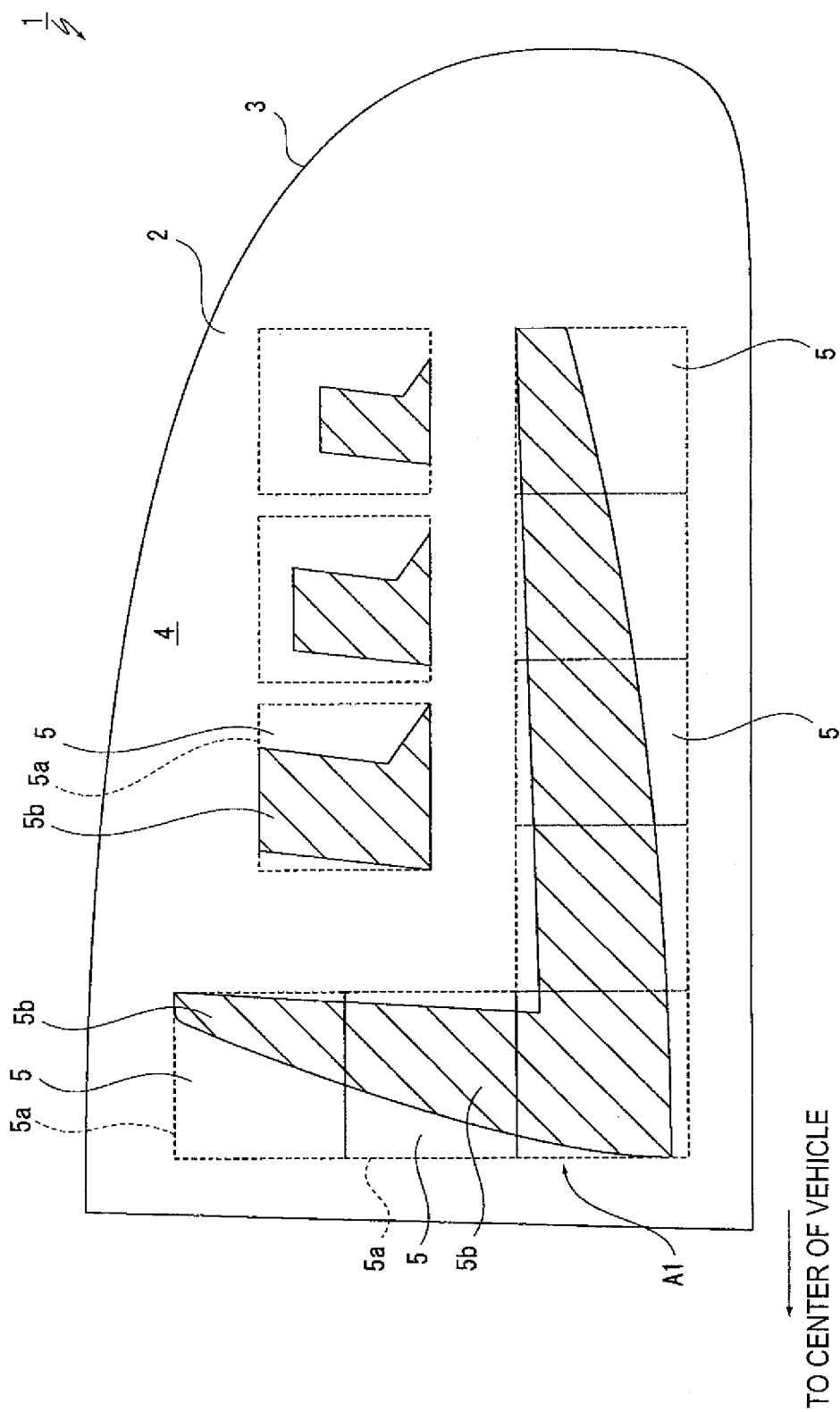
FIG. 1 is a schematic back view of a vehicular lamp.

The vehicular lamp 1 has a housing 3 which has a transparent resin cover 2, for example, and an interior space in the housing 3 is formed as a lamp chamber 4 (refer to FIG. 1).

A plurality of organic EL (Electro Luminescence) light emitting units 5, 5, . . . are disposed in the lamp chamber 4. The organic EL light emitting units 5, 5, . . . have glass substrates 5a, 5a, . . . and organic light emitting layers 5b, 5b, . . .

Figure 2:
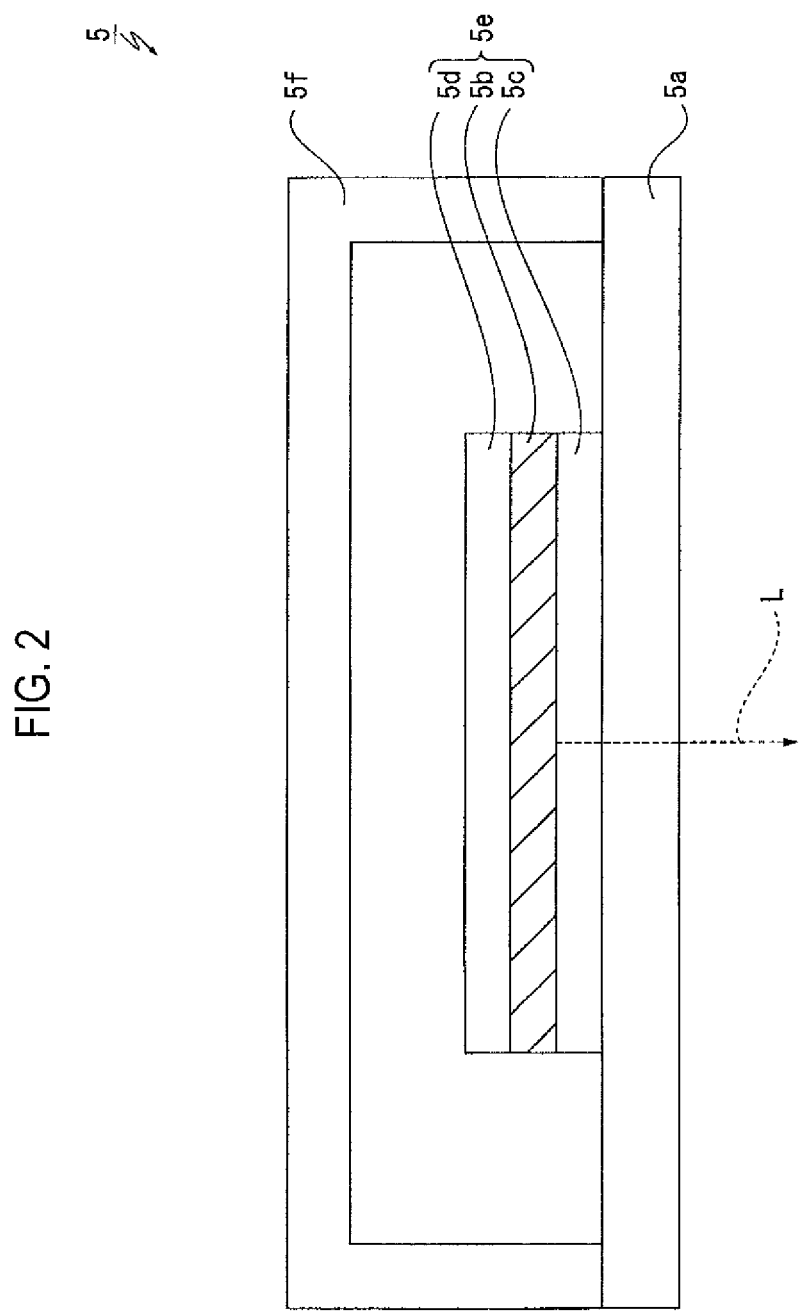
FIG. 2 is a schematic cross-sectional view of an organic EL light emitting unit.

Each organic EL light emitting unit 5 includes the substrate 5a, an organic EL device 5e which is formed on the substrate 5a, and a cap 5f which seals the organic EL device 5e (refer to FIG. 2). The organic EL device 5e is formed by sandwiching the organic light emitting layer 5b by an anode layer 5c and a cathode layer 5d. The anode layer 5c is in contact with the substrate 5a and is formed of a transparent metallic film. The cathode layer 5d is formed of a transparent metallic film, for example.

The cap 5f is formed of glass, for example.

A driving voltage is applied between the anode layer 5c and the cathode layer 5d of each organic EL light emitting unit 5 through a driving circuit, not shown, and the organic light emitting layer 5b emits light in response to the application of the driving voltage. Light emitted by the organic light emitting layer 5b is emitted to the outside of the organic EL light emitting unit 5 via the anode layer 5c and the substrate 5a as indicated by an arrow L in FIG. 2. Consequently, a lower surface of the substrate 5a functions a light emitting plane of the organic EL light emitting unit.

The organic EL light emitting units 5, 5, . . . are disposed so that their light emitting planes are oriented to the rear of the vehicle.

Some of the organic EL light emitting units 5, 5, . . . are disposed within a substantially L-shaped area Al in the lamp chamber 4 (refer to FIG. 1). The area A1 is an area formed in such a way that a standing back portion of the L-shaped area is disposed near an end portion of the lamp chamber 4 which lies closer to a laterally central portion of the vehicle, while a bottom portion of the L-shaped area is disposed near a lower end portion of the lamp chamber 4. The organic EL light emitting units 5, 5, . . ., disposed within the area A1 are light sources for a turn signal lamp and emit individually amber light.

On the other hand, the remaining organic EL light emitting units 5, 5, . . . are aligned laterally apart from one another in a predetermined area outside the area A1. The organic EL light emitting units 5, 5, . . . which are aligned outside the area A1 are light sources for a tail/stop lamp and emit individually red light.

In the vehicular lamp 1 of this embodiment, all the substrates 5a, 5a, . . . and caps 5f, 5f, . . . of the individual organic EL light emitting units 5, 5, . . . have the same shape and size. On the other hand, the organic light emitting layers 5b, 5b, . . . which are formed in the organic EL light emitting units 5, 5, . . . have different shapes or sizes. In this embodiment, all the organic EL light emitting units 5, 5, . . . which are formed within the area A1 have the organic light emitting layers 5b, 5b, . . . which are different in shape or size from one another. On the other hand, all the organic EL light emitting units 5, 5, . . . which are aligned outside the area A1 have the organic light emitting layers 5b, 5b, . . . which are same in shape but are different in size.

In this way, the vehicular lamp 1 of this embodiment includes the plurality of organic EL light emitting units 5 which each include the substrate 5a, the organic EL device 5e having the organic light emitting layer 5b formed on the substrate 5a and the cap 5f which seals the organic EL device 5e. The shapes or sizes of the organic light emitting layers 5b of at least two of the organic EL light emitting units 5 are different from each other, while all the organic EL light emitting units 5 have the same substrates 5a and caps 5f in shape and size.

By adopting this configuration, the same substrates 5a and caps 5f can be made use of commonly for the organic light emitting layers 5b which are different in shape or size.

Consequently, it is possible to obviate the necessity of forming substrates 5a and caps 5f one by one so as to match the shapes or sizes of organic light emitting layers 5b which are different in shape or size from one another, and this can realize a reduction in the number of man-hours, thereby making it possible to prevent an increase in production costs of vehicular lamps.

It is noted that to form organic light emitting layers 5b, 5b, . . . which are different in size or shape, for example, different masks should be used in patterning organic light emitting layers 5b, 5b, . . . through vapor deposition.

In addition, in the vehicular lamp 1 of this embodiment, since all the organic EL light emitting units 5 have the substrates 5a and the caps 5f which are same in shape and size, the same substrates 5a and caps 5f can be used commonly for all the organic EL light emitting units. Consequently, the advantage of preventing an increase in production costs can be enhanced.

Here, in preventing the increase in production costs of the vehicular lamp 1 by using the same substrates 5a and caps 5f commonly for the organic EL light emitting units, all the organic EL light emitting units 5 do not necessarily have to have the substrates 5a and the caps 5f which are same in shape and size, and at least two organic EL light emitting units should have the substrates 5a and the caps 5f which are same in shape and size.

Figure 3:
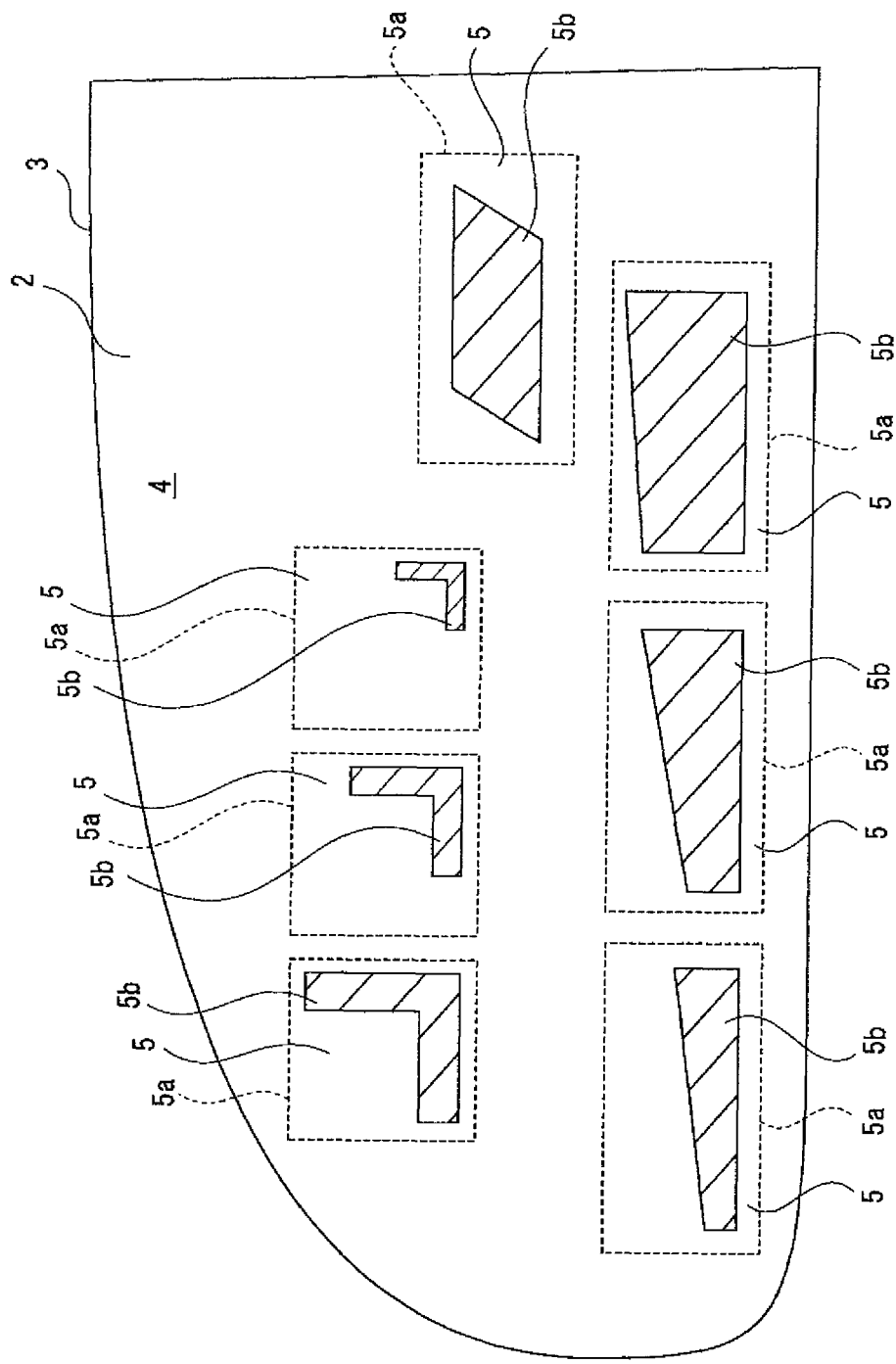
FIG. 3 is a schematic back view of a vehicular lamp which includes organic EL light emitting units having substrates and caps which are different in shape or size.

FIG. 3 is a schematic back view of a vehicular lamp 1A which includes organic EL light emitting units 5, 5, . . . having substrates 5a and caps 5f which are different in shape or size. In the following description, like reference numerals will be given to portions like to those that have already been described to thereby omit the description thereof.

Two types of organic EL light emitting units 5, 5, . . . are disposed in a lamp chamber 4 of the vehicular lamp 1A, and these organic EL light emitting units 5, 5, . . . have substrates 5a and caps 5f which are different in shape or size. Organic EL light emitting units 5 of one type have square substrates 5a and caps 5f which are same in size. Organic EL light emitting units 5 of the other type have rectangular substrates 5a and caps 5f which are same in size. The organic EL light emitting units 5 of the one type have individually organic light emitting layers 5b which are different in size. The organic EL light emitting units 5 of the other type have individually organic light emitting layers 5b which are different in shape.

In the vehicular lamp 1A configured in the way described above, at least two of the plurality of organic EL light emitting units 5, 5, . . . have the organic light emitting layers 5b which are different in shape or size and the substrates 5a and the caps 5f which are same in shape and size.

Since at least two of the plurality of organic EL light emitting units 5, 5, . . . have the substrates 5a and the caps 5f which are same in shape and size, although the organic EL light emitting units 5, 5, . . . have the organic light emitting layers 5b which are different in shape or size, the same substrates 5a and caps 5f can be used commonly for all the organic EL light emitting units 5, 5, . . . . Consequently, it is possible to prevent the increase in production costs of the vehicular lamp 1.

In addition, in the vehicular lamp 1A, the organic EL light emitting units 5, 5, . . . are provided which have the substrates 5a and the caps 5f which are different in shape or size. As in the case of the vehicular lamp 1 shown in FIG. 1, when the shapes and sizes of the substrates 5a and the caps 5f of all the organic EL light emitting units 5, 5, . . . are same, since the organic light emitting layers 5b have to be formed on the substrates 5a which are same in shape and size, limitations can be imposed on the design of an external appearance or a light distribution pattern of the vehicular lamp. In contrast with this, according to the vehicular lamp 1A in which the organic EL light emitting units 5, 5, . . . having the substrates 5a and the caps 5f which are different in shape or size are allowed to coexist as described above, since the organic light emitting layers 5b can be formed on the substrates 5a which are different in shape or size, it is possible not only to improve the design of the vehicular lamp in various ways but also to improve the degree of freedom in designing light distribution patters for the vehicular lamp.

Further, it is also possible to enhance the space efficiency by reducing gaps that are defined between the organic EL light emitting units.

Here, the vehicular lamp of the invention can also be configured so that a light distribution pattern is formed by overlapping light from a plurality of organic EL light emitting units 5, 5, which have organic light emitting layers 5b, 5b, . . . which are different in shape or size. As this occurs, in order to overlap light from the plurality of organic EL light emitting elements 5, 5, . . . , for example, intervals at which the individual organic EL light emitting units 5 are disposed or angles at which the individual organic EL light emitting units 5 are set should be adjusted so as to control the light from the individual organic EL light emitting units 5.

In case the shapes or sizes of the organic light emitting layers 5b, 5b, . . . are different, the luminous intensity distributions of individual light distributions which are formed by the organic EL light emitting units 5, 5, . . . are different. Because of this, in the event that a light distribution pattern is attempted to be formed by overlapping light from the organic EL light emitting units 5, 5, . . . which have the organic light emitting layers 5b, 5b, . . . which are different in shape or size, a light distribution pattern is formed by overlapping a plurality of light distributions having different luminous intensity distributions. Consequently, it is possible to improve the degree of freedom in designing light distribution patterns, whereby it becomes easy to form a desired light distribution pattern.

Figure 4:
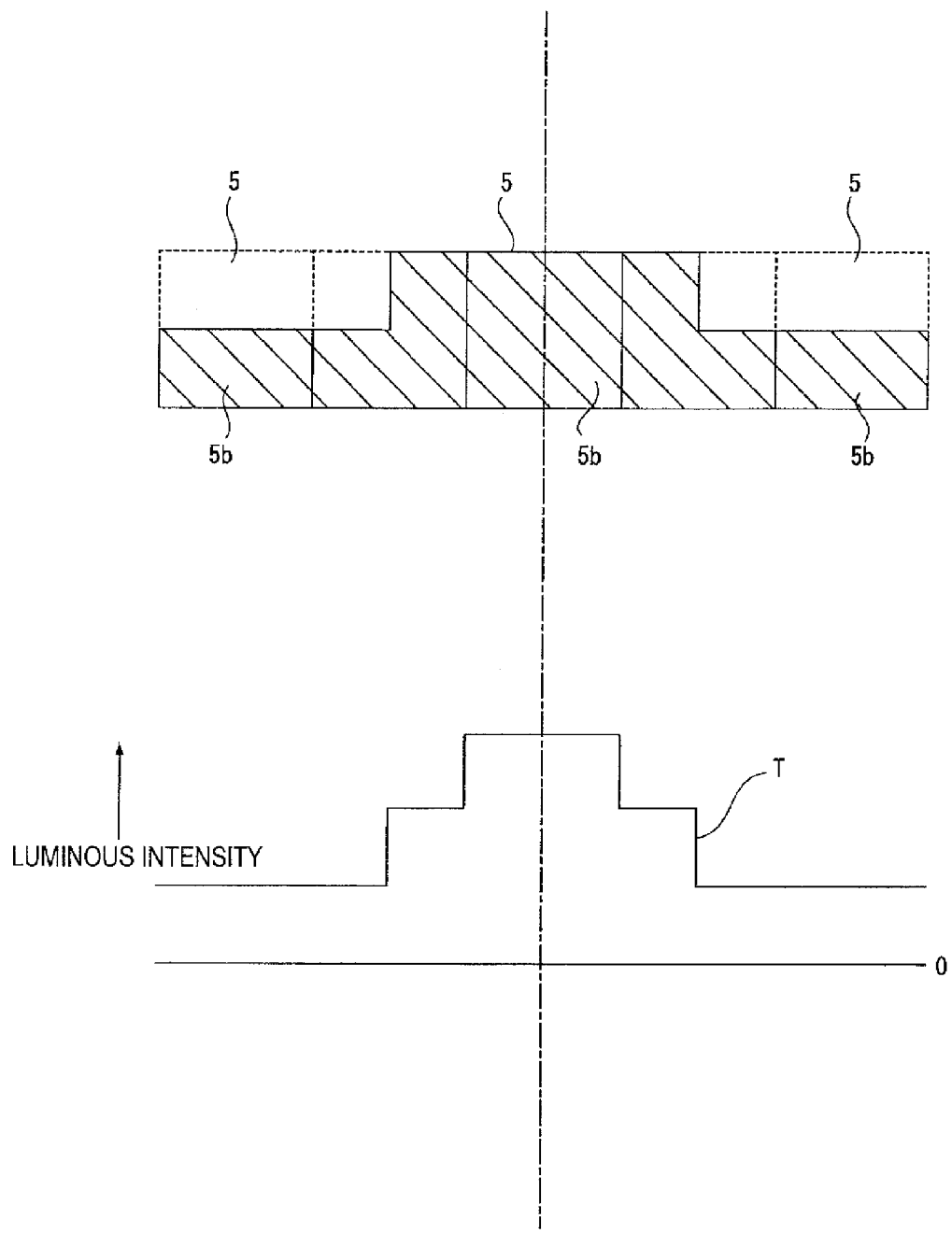
FIG. 4 is a view explaining an example of setting a luminous intensity distribution.

As this occurs, in forming a light distribution pattern by light from the plurality of organic EL light emitting units 5, 5, . . . , the organic light emitting layers 5b, 5b, . . . of the organic EL light emitting units 5, 5, . . . can also be formed as shown in an upper half portion of FIG. 4.

In a case shown in the upper half portion of FIG. 4, five organic EL light emitting units 5, 5, . . . are aligned in a row in the lateral direction of the vehicle. The area of the organic light emitting layer 5b of the organic EL light emitting unit 5 which is positioned in the center of the five laterally aligned organic EL light emitting units 5, 5, . . . is the largest, while the areas of the organic light emitting surfaces 5b, 5b, . . . of the organic EL light emitting units 5, 5, . . . become smaller as the organic EL light emitting units 5, 5, . . . are positioned farther away from the central organic EL light emitting unit 5.

A luminous intensity distribution T shown in a lower half portion of FIG. 4 is realized as a luminous intensity distribution of a light distribution pattern which is formed by the light from the five organic EL light emitting units 5, 5, . . . by setting the areas of the organic light emitting layers 5b, 5b, . . . in the way described above. Namely, the luminous intensity distribution results in which the luminous intensity at a central portion is the strongest and is gradually reduced towards an outer circumferential edge of the light distribution pattern (hereinafter, referred to as a "mountain-shaped luminous intensity distribution").

By realizing the light distribution pattern having the mountain-shaped luminous intensity distribution described above, in particular, when the vehicular lamp is applied to a tail/stop lamp, it is possible to improve the alerting function to alert the drivers of vehicles running around the subject vehicle when it is lit.

In forming the light distribution pattern having the mountain-shaped luminous intensity distribution, the number of organic EL light emitting units is not limited to five, and hence, the provision of at least three organic EL light emitting units 5 should suffice.

Figure 5:
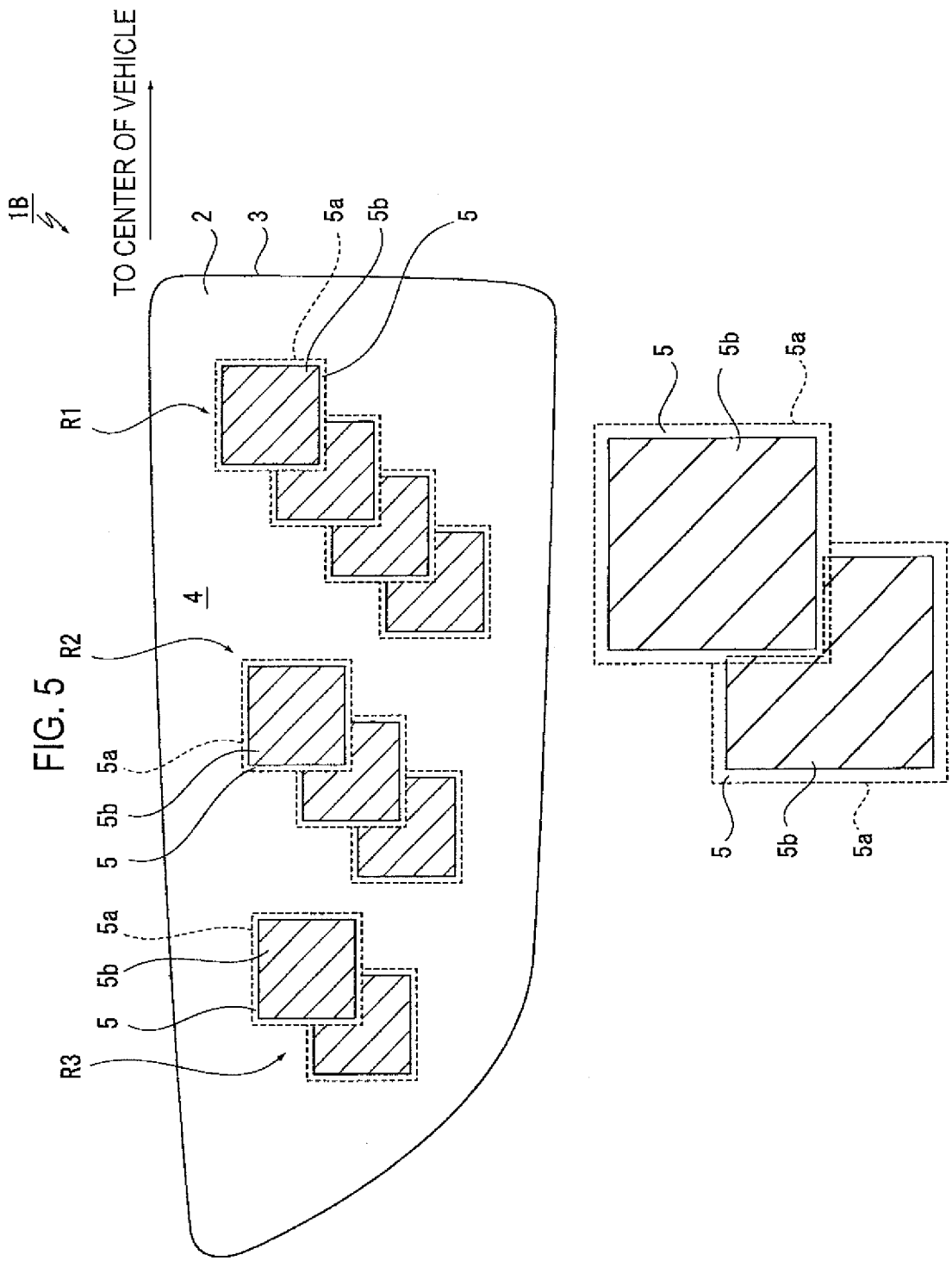
FIG. 5 is a view explaining a configuration in which organic EL light emitting units are partially overlapped one on another in a depth-wise direction.

Additionally, the vehicular lamp of the invention can also be configured as a vehicular lamp 1B shown in FIG. 5 in which organic EL light emitting units 5, 5, . . . are partially overlapped in a depth-wise direction (which is a direction away from the cover 2).

In a case shown in FIG. 5, a first row R1, a second row R2 and a third row R3 are formed sequentially in that order from a side facing the lateral center of the vehicle in a lamp chamber 4. Four organic EL light emitting units 5, 5, . . . are aligned while being overlapped partially in a depth-wise direction in the first row R1. Three organic EL light emitting units 5, 5, . . . are aligned while being overlapped partially in the depth-wise direction in the second row R2. Two organic EL light emitting units 5, 5 are aligned while being overlapped partially in the depth-wise direction in the third row R3. In each of the rows of organic EL light emitting units, in the two organic EL light emitting units 5, 5 which are disposed so as to be aligned in the depth-wise direction, as shown in an enlarged fashion in FIG. 5, the organic EL light emitting units 5, 5 are partially overlapped each other in the depth-wise direction. An organic light emitting layer 5b of the organic EL light emitting unit 5 which lies on a farther side (which is a side distant from the cover 2) is formed only in an area which does not overlap an organic light emitting layer 5b of the organic EL light emitting unit 5 which lies on a near side (which is a side near to the cover 2).

By adopting the configuration in which the organic EL light emitting units 5, 5, ... are partially overlapped one on another in the depth-wise direction, the vehicular lamp 1B is allowed to look externally as having a certain depth. Additionally, by adopting the configuration in which of the two organic EL light emitting units 5, 5 which are disposed to be aligned in the depth-wise direction as described above, the organic light emitting layer 5b of the organic EL light emitting unit 5 which lies on the farther side is formed only in the area which does not overlap the organic light emitting layer 5b of the organic EL light emitting unit 5 which lies on the near side, in the organic EL light emitting unit 5 which lies on the farther side, the organic light emitting layer 5b is not formed on a wasteful area which is covered by the organic light emitting layer 5b of the organic EL light emitting unit 5 which lies on the near side. This suppress the wasteful consumption of the material which makes up the organic light emitting layer 5b, thereby making it possible to prevent the increase in production costs of the vehicular lamp.

The invention is not limited to the specific embodiments that have been described heretofore, and hence, various modifications can be thought of.

For example, the thickness of organic light emitting layers 5b, 5b, ... (the number of organic light emitting layers 5b, 5b, ... to be stacked) can be changed differently. By changing differently the thickness of the organic light emitting layers 5b, 5b, ..., the quantity of light emitted from the individual organic EL light emitting units 5, 5, ... can be changed differently, thereby making it possible to improve the degree of freedom in designing light distribution patterns by the light emitted from the plurality of organic EL light emitting units 5, 5, ....

Additionally, in the embodiment, while the cathode layer 5d is described as being formed as the transparent layer, the cathode layer 5d can also be formed as a non-transparent layer of an aluminum layer or the like, for example.

Further, in the embodiments, while the vehicular lamp of the invention is described as being applied to the rear combination lamp, the invention can also be applied widely to other vehicular lamps such as a DRL (Daytime Running Lamp), a CLL (clearance Lamp) or the like, for example.

What is claimed is:

1. A vehicular lamp comprising:
   a plurality of light emitting units, each of light emitting units including a substrate, an organic electro luminescence device having an organic light emitting layer formed on the substrate, and a cap configured to seal the organic electro luminescence device, wherein
   at least two of the plurality of light emitting units have the organic light emitting layers which are different in shape or size, the substrates which are same in shape and size, and the caps which are same in shape and size.

2. The vehicular lamp according to claim 1, wherein
   all the light emitting units have the substrates which are same in shape and size and the caps which are same in shape and size.

3. The vehicular lamp according to claim 1, wherein
   a light distribution pattern is formed by overlapping light from the plurality of light emitting units having the organic light emitting layers which are different in shape or size.

4. The vehicular lamp according to claim 1, wherein
   in at least three of the plurality of light emitting units, an area of the organic light emitting layer formed on the light emitting unit which is positioned in the center of the three light emitting units is the largest, and areas of the organic light emitting layers of the light emitting units become smaller as the light emitting units are positioned farther away from the centrally positioned light emitting unit.

5. The vehicular lamp according to claim 1, wherein
   at least two of the plurality of light emitting units are partially overlapped each other in a depth-wise direction, and wherein
   of the two light emitting units, the organic light emitting layer of the light emitting unit which is positioned on a farther side is formed only in an area which does not overlap the organic light emitting layer of the light emitting unit which is positioned on a near side.

* * * * *